United States Patent Office 3,136,754
Patented June 9, 1964

3,136,754
AZIRIDINYL-HALOCYCLOTRIPHOSPHAZA-1,3,5-TRIENES
Gerhard F. Ottmann, Hamden, Haywood Hooks, Jr., West Haven, Ehrenfried H. Kober and Rudi F. W. Rätz, Hamden, Conn., and Samuel S. Ristich, Patchogue, N.Y., assignors to Olin Mathieson Chemical Corporation, New York, N.Y., a corporation of Virginia
No Drawing. Filed May 18, 1962, Ser. No. 196,013
6 Claims. (Cl. 260—239)

This invention relates to (aziridinyl)-halocyclotriphosphaza-1,3,5-trienes, also referred to as (aziridinyl)-halophosphonitriles or (aziridinyl)-phosphonitrilic halides, and to a process for the synthesis of such compounds. In particular, the invention relates to compounds represented by the formula (I) 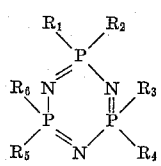

wherein each of the symbols R represents a member of the group consisting of halogen of atomic weight less than 80, amino, mono-lower alkylamino, di-lower alkylamino and ethyleneimine, there being at least one ethyleneimine group, one halogen and one member of the group consisting of amino, lower alkylamino and di-lower alkylamino.

The mono- and di-lower alkylamino groups may include basic groups in which the nitrogen contains such lower alkyl groups as methyl, ethyl, propyl, isopropyl, n-butyl, t-butyl and the like. The dimethylamino group is preferred. The halogens chlorine, bromine and fluorine are included, but the bromides and especially the chlorides are preferred. Preferably also all halogens in a given compound are the same.

The compounds of Formula I are produced from trimeric phosphonitrilic halide, (II) 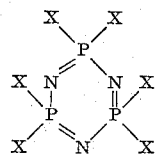

wherein each X represents a halogen of atomic weight less than 80, which is readily prepared by the reaction of a phosphoruspentahalide, e.g. phosphoruspentachloride, and ammonium halide, e.g. ammonium chloride. The fluorides are obtained from the chlorides by reaction of the latter with potassium fluorosulfinate or with silver fluoride.

The compounds of the invention may be produced by two alternate methods. According to one modification, trimeric phosphonitrilic halide, e.g. trimeric phosphonitrilic chloride, is reacted with $x$ moles of ethyleneimine, $x$ being equal to 1, 2, 3, or 4. The (aziridinyl)-chlorophosphonitrile formed is then reacted with $(5-x)$ moles or less of ammonia or mono- or di-lower alkyl amine provided that at least one halogen atom remains.

Alternatively the procedure may be reversed. Thus the trimericphosphonitrilic halide is reacted with $y$ moles of ammonia, mono- or di-lower alkylamine, $y$ being equal to 1, 2, 3 or 4. The amino-halophosphonitrile thus produced is subsequently reacted with $(5-y)$ moles or less of ethyleneimine with the same proviso.

Alkylamines which may be used to react with the trimeric phosphonitrilic halide include, for example, methylamine, ethylamine, propylamine, butylamine, dimethylamine, diethylamine, dipropylamine, di-t-butylamine and the like.

The reactions are carried out in the presence of hydrogen halide acceptors which include tertiary bases such as pyridine, tertiary alkylamines, e.g. triethylamine, etc. The proportion of tertiary amine is the same as the number of halogens removed. The reactions are carried out in a solvent, e.g. aromatic hydrocarbons such as benzene, toluene, xylene, chlorobenzene and the like, ethers such as diethyl ether, dioxane and the like, chlorinated hydrocarbons such as chloroform, carbon tetrachloride, trichloroethylene, etc. Reaction temperatures within the range of about 0° to 100° C. may be used, but a range between about 15° and 55° is preferred. The reaction time varies within a broad range. A time ranging from about two hours to about three days at room temperature is sufficient in most cases. In general (aziridinyl)-halophosphonitriles react more readily with amines than amino-halophosphonitriles react with ethyleneimine.

The compounds of this invention are useful as insect sterilizing agents. The compounds may be used to combat insects such as houseflies, screwworms, stable flies, chinch bugs, mosquitoes and the like by use of conventional sprays, dusts and the like containing a minor amount, e.g. about 0.01% to about 10% by weight, of the active ingredient together with an appropriate inert carrier as well as other adjuvants. The composition may be applied in the environment of the insect or on surfaces on which it may light including plants attacked by the pest. The compound may also be made up in the form of baits, i.e. by absorption on or mixture with an attractant for the insect, for example, sucrose, glucose or the like and if desired, together with cornmeal, powdered egg or powdered milk, etc.

The following examples are illustrative of the invention. All temperatures are expressed in degrees centigrade.

EXAMPLE 1

*Bis(Aziridinyl)-Bis(Dimethylamino)Dichlorophosphonitrile*

An ice-cold solution of 77.4 grams of 25% aqueous dimethylamine (0.43 mole) is added all at once to a cooled solution of 34.8 grams (0.1 mole) of trimeric phosphonitrilic chloride in 300 milliliters of ether in an autoclave. The vessel is closed immediately and the contents are stirred for 20 minutes. The temperature rises as high as 38° C. From the reaction mixture the ethereal solution is separated, dried over $CaCl_2$, and distilled. The remaining oil crystallizes upon standing at room temperature. A 90% yield of crude solid product is obtained (adhering oil is removed by spreading on a porous plate). After two recrystallizations from 100 milliliters of heptane, a 66% yield of pure 4,6-bis(dimethylamino)2,2,4,6-tetrachlorophosphonitrile, M.P. 102° C., is attained.

*Analysis.*—Calcd. for $C_4H_{12}Cl_4N_5P_3$: C, 13.1%; H, 3.3%; N, 19.05%. Found: C, 12.20%, 13.13%; H, 3.71%; N, 19.20%; N, 19.33%.

A solution of 36.5 grams (0.1 mole) of 4,6-bis(dimethylamino)-2,2,4,6-tetrachlorophosphonitrile in 200 milliliters of toluene is added dropwise, with stirring, to a mixture of 25.8 grams (0.6 mole) of ethyleneimine, 60.6 grams (0.6 mole) of triethylamine, and 200 milliliters of toluene. The entire reaction mixture is transferred into a pressure vessel and heated for one hour at 100° C. with stirring. The liquid phase is separated and the solvent and excess amines are removed in vacuo at a bath temperature not exceeding 50° C. The remaining oil (40.9 grams) crystallizes partly upon standing yielding 9 grams of crystalline material. After two recrystallizations from petroleum ether (B.P. 30–60° C.), 2.0 grams of bis(aziridinyl)-bis(dimethylamino)dichlorophosphonitrile are obtained. Melting point 128–129° C.

*Analysis.*—Calcd. for $C_8H_{20}Cl_2N_7P_3$: C, 25.45%; H, 5.36%; N, 26.05%. Found: C, 25.70%; H, 5.52%; N, 25.98%.

EXAMPLE 2

*Bis(Aziridinyl) - Bis(Dimethylamino)Dichlorophosphonitrile*

To a solution of 36.5 grams of 4,6-bis(dimethylamino)-2,2,4,6-tetrachlorophosphonitrile in 250 milliliters of benzene is added a solution of 8.6 grams of ethyleneimine and 20.2 grams of triethylamine in 100 milliliters of benzene within a period of 45 minutes while stirring. The solution is kept overnight at room temperature. Triethylamine hydrochloride (26.2 grams) is removed by filtration and the filtrate is concentrated to dryness in vacuo. The white crystalline residue (37.2 grams) is recrystallized several times from n-hexane yielding 13.8 grams of bis(aziridinyl) - bis(dimethylamino)-dichlorophosphonitrile, M.P. 127–128° C.

*Analysis.*—Calcd. for $C_8H_{20}Cl_2N_7P_3$: C, 25.4%; H, 5.36%; Cl, 18.8%; N, 26.05%; P, 24.6%. Found: C, 24.88%; H, 4.30%; Cl, 18.57%; N, 26.10%; P, 24.3%.

EXAMPLE 3

*2,2 - Bis(Aziridinyl)-4,6-Bis(Dimethylamino)-4,6-Dichlorophosphonitrile*

34.8 grams (0.1 mole) of $(PNCl_2)_3$ are dissolved in 150 milliliters of dry toluene and a solution, consisting of 8.6 grams (0.2 mole) of ethyleneimine and 20.2 grams (0.2 mole) of triethylamine in 150 milliliters of toluene, is added dropwise, with stirring, over a period of 1.25 hours. A reaction temperature of 35–38° C. is maintained during the addition and then stirring is continued overnight at room temperature. Triethylamine hydrochloride is removed by filtration (31.6 grams) and the filtrate is concentrated in vacuo until heavy crystallization occurs. The crystals are collected and dried, yielding 20.5 grams (57% of the theory) of 2,2-bis(aziridinyl) tetrachlorocyclotriphosphaza-1,3,5-triene, [2,2-bis(aziridinyl) - tetrachlorophosphonitrile], M.P. 104–105° C. Recrystallization from 60 milliliters of hexane raises the melting point to 105–106° C.

*Analysis.*—Calcd. for $C_4H_8Cl_4N_5P_3$: C, 13.29%; H, 2.21%, N, 19.39%. Found: C, 12.90%; H, 2.27%; N, 19.21%.

To a solution of 36.1 grams of bis(aziridinyl)tetrachlorophosphonitrile in 300 milliliters of dry ether are added over a period of three hours a cold solution of 18.0 grams of dimethylamine in 200 milliliters of dry ether. While adding, a temperature of 0° to 4° C. is maintained. After complete addition, the reaction mixture is allowed to warm to room temperature and is freed from precipitated dimethylamine hydrochloride. The ether solution is concentrated in vacuo and the solid residue (37 grams) is recrystallized from n-hexane yielding 10.4 grams of bis(aziridinyl) - bis(dimethylamino)dichlorophosphonitrile, M.P. 128–128.5° C.

*Analysis.*—Calcd. for $C_8H_{20}N_7P_3$: C, 25.4%; H, 5.36%; N, 26.05%; P, 24.6%. Found: C, 25.12%; H, 5.32%; N, 26.09%; P, 24.1%.

EXAMPLE 4

*2-Mono(Aziridinyl)-2,4,6-Tris(Dimethylamino)-4,6-Dichlorophosphonitrile*

A solution of 34.8 grams (0.1 mole) of trimeric phosphonitrilic chloride in 300 milliliters of ether and 155 grams (0.86 mole) of a 25% aqueous solution of dimethylamine are cooled and combined in an autoclave. After stirring for 30 to 40 minutes, the ether phase is separated, dried with $CaCl_2$ and distilled. The remaining oil crystallizes in silky needles which eventually requires several days. The crystals are freed from oil by spreading on a porous plate and then recrystallized from n-heptane. The pure 2,4,6-tris(dimethylamino)-2,4,6-trichlorophosphonitrile melts at 105–106° C.

*Analysis.*—Calcd. for $C_6H_{18}Cl_3N_6P_3$: C, 19.3%; H, 4.8%; N, 22.5%. Found: C, 19.05%; H, 5.3%; N, 22.54%.

8.6 grams of ethyleneimine and 20.2 grams of triethylamine in 100 milliliters of benzene are added to a stirred solution of 37.3 grams of 2,4,6-tris(dimethylamino)-2,4,6-trichlorophosphonitrile in 250 milliliters of benzene over a period of 45 minutes. After 24 hours, 13.2 grams of triethylamine hydrochloride are removed and the filtrate is concentrated to dryness yielding 38 grams of crude reaction product. Recrystallization from 125 milliliters of n-hexane gives 11.0 grams of the above compound, M.P. 85.5–86.5° C., and 12.1 grams of a second fraction, M. P. 73–75° C.

*Analysis.*—Calcd. for $C_8H_{22}Cl_2N_7P_3$: C, 25.3%; H, 5.8%; N, 25.8%; P, 24.45%. Found: C, 25.4%, 25.6%; H, 6.14%, 6.00%; N, 25.71%, 25.96%; P, 24.2%.

EXAMPLE 5

*2-Mono(Aziridinyl)-2,4,6-Tris(Dimethylamino)-4,6-Dibromophosphonitrile*

By substituting 2,4,6-tris(dimethylamino)-2,4,6-tribromophosphonitrile in Example 4, 2-mono(aziridinyl)-2,4,6-tris(dimethylamino) - 4,6-dibromophosphonitrile is produced.

EXAMPLE 6

*2-Mono(Aziridinyl)-2,4,6-Tris(Diethylamino)-4,6-Dichlorophosphonitrile*

2,4,6 - tris(diethylamino)-2,4,6-trichlorophosphonitrile, B.P. 102°/2 mm., $n_D^{23}$ 1.5100, is used as starting material to react with one mole of ethyleneimine in the procedure of Example 4 to obtain 2-mono(aziridinyl)-2,4,6-tris(diethylamino)-4,6,-dichlorophosphonitrile.

EXAMPLE 7

0.5 gm. 2,2 - bis(aziridinyl)-4,6-bis(dimethylamino)-4,6-dichlorophosphonitrile are dissolved in 40 ml. of chloroform. This is blended with 100 gm. of granular sucrose. The resulting slurry is stirred until the chloroform has evaporated. The dried bait thus formed having a concentration of 0.5% of active sterilant is then reground in a mortar and may be used as insect bait, e.g. for houseflies (*Musca domestica*).

EXAMPLE 8

0.5 gm. of 2-mono(aziridinyl) - 2,4,6 - tris(dimethylamino)-4,6-dichlorophosphonitrile is dissolved in 100 ml. of water. Three drops of a 5% Tween 20 surfactant solution are added and stirred. This 0.5% solution is used as a spray applied to insects.

EXAMPLE 9

*2,2,4,4-Tetrakis(Aziridinyl)-6-(Methylamino)-6-Chlorophosphonitrile*

To 32.6 grams of 2,2-bis(aziridinyl)tetrachlorophosphonitrile in 250 milliliters of benzene is added dropwise a solution of 7.8 grams of ethyleneimine and 18.6 grams of triethylamine in 100 milliliters of benzene over a period of 90 minutes, with stirring. The solution is allowed to remain for 18 hours at 20° C. before 24.1 grams of triethylamine hydrochloride is removed. The filtrate is concentrated in vacuo and the residue recrystallized from $CCl_4$ and then twice from heptane. Yield: 11.7 grams of 2,2,4,4-tetrakis(aziridinyl)-6,6-dichloro-cyclo-triphosphaza - 1,3,5 - triene, [2,2,4,4 - tetrakis(aziridinyl)-6,6-dichlorophosphonitrile], M.P. 128–129° C.

*Analysis.*—Calcd. for C, 25.6%; H, 4.31%; N, 26.2%. Found: C, 25.90%, 25.80%; H, 4.68%, 4.61%; N, 26.48%, 26.27%.

The reaction of 2,2,4,4-tetrakis(aziridinyl)-6,6-dichlorophosphonitrile with one mole of monomethylamine according to the procedure of Example 3 gives 2,2,4,4-tetrakis(aziridinyl)-6-monomethylamino-6-chlorophosphonitrile.

EXAMPLE 10

The reaction of 2,2,4,4-tetrakis(aziridinyl)-6,6-dichlorophosphonitrile with one mole of ammonia according to the procedure of Example 3 gives 2,2,4,4-tetrakis(aziridinyl)-6-amino-6-chlorophosphonitrile.

What is claimed is:

1. A compound of the formula

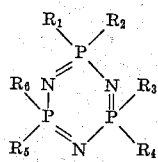

wherein $R_1$, $R_2$, $R_3$, $R_4$, $R_5$ and $R_6$ each is a member of the group consisting of amino, lower alkylamino, di-lower alkylamino, ethyleneimine and halogen of atomic weight less than 80, at least one ethyleneimine group, one halogen and one member of the group consisting of amino, lower alkylamino and di-lower alkylamino being present.

2. Aziridinyl-di(lower alkyl amino)halophosphonitrile.
3. Bis(aziridinyl) - bis(dimethylamino)dichlorophosphonitrile.
4. 2,2-bis(aziridinyl) - 4,6 - bis(dimethylamino)-4,6-dichlorophosphonitrile.
5. Mono(aziridinyl)-tris(dimethylamino)dichlorophosphonitrile.
6. 2-mono(aziridinyl)-2,4,6 - tris(dimethylamino)-4,6-dichlorophosphonitrile.

References Cited in the file of this patent

UNITED STATES PATENTS

| | | |
|---|---|---|
| 2,670,347 | Kuh et al. | Feb. 23, 1954 |
| 2,858,306 | Ratz et al. | Oct. 28, 1958 |

FOREIGN PATENTS

| | | |
|---|---|---|
| 1,174,704 | France | Nov. 10, 1958 |

OTHER REFERENCES

Audrieth: Records of Chemical Progress, vol. 20, No. 2, June 1959, page 61.